(12) United States Patent
Derr

(10) Patent No.: US 11,274,947 B2
(45) Date of Patent: Mar. 15, 2022

(54) MEASUREMENT DEVICE, DESIGN SERIES, AND USE OF A COMMUNICATION DEVICE

(71) Applicant: Testo SE & Co. KGaA, Lenzkirch (DE)

(72) Inventor: Andreas Derr, Donaueschingen (DE)

(73) Assignee: Testo SE & Co. KGaA, Lenzkirch (DE)

( * ) Notice: Subject to any disclaimer, the term of this patent is extended or adjusted under 35 U.S.C. 154(b) by 204 days.

(21) Appl. No.: 16/529,014

(22) Filed: Aug. 1, 2019

(65) Prior Publication Data
US 2020/0041315 A1 Feb. 6, 2020

(30) Foreign Application Priority Data
Aug. 3, 2018 (DE) .......................... 102018118933.8

(51) Int. Cl.
*G01D 11/30* (2006.01)
*G01D 11/24* (2006.01)
*H04M 1/02* (2006.01)

(52) U.S. Cl.
CPC ........... *G01D 11/245* (2013.01); *G01D 11/30* (2013.01); *H04M 1/0252* (2013.01)

(58) Field of Classification Search
CPC .............................. G01D 11/245; G01D 11/30
See application file for complete search history.

(56) References Cited

U.S. PATENT DOCUMENTS

| 2011/0320130 A1* | 12/2011 | Valdes | A61B 5/7278 |
| | | | 702/19 |
| 2017/0052042 A1* | 2/2017 | Bright | G01D 11/245 |
| 2018/0063769 A1* | 3/2018 | Lee | H04M 1/72412 |

* cited by examiner

*Primary Examiner* — Jamel E Williams
(74) *Attorney, Agent, or Firm* — Volpe Koenig

(57) ABSTRACT

A measurement device (1) including a measurement module (2) and a communication module (3), in which the measurement module (2) has at least one sensor (4) for measuring a physical or chemical quantity. In the position of use, an interface (5) is provided for the communication between the measurement module (2) and the communication module (3). The measurement module (2) has a measurement module housing (6) and the communication module (3) has a communication module housing (7), which can be interconnected in a mechanically releasable manner and form in the connected state a closed measurement device housing (15).

19 Claims, 9 Drawing Sheets

MEASUREMENT DEVICE, DESIGN SERIES, AND USE OF A COMMUNICATION DEVICE

INCORPORATION BY REFERENCE

The following documents are incorporated herein by reference as if fully set forth: German Patent Application No. 10 2018 118 933.8, filed Aug. 3, 2018.

BACKGROUND

The invention relates to a measurement device comprising a measurement module and a communication module, wherein the measurement module comprises at least one sensor for measuring a physical and/or chemical parameter, wherein an interface is or can be organized for the communication between the measurement module and the communication module.

The invention further relates to a design series and the use of a communication device for the sending and/or receiving of data and/or commands to and/or from a measurement device.

Such measurement devices are known and are formed for example by mounting a separate sensor in a communication device, such as a mobile telephone, at an electrical interface, such as a USB socket and/or an audio jack socket.

The drawback in these solutions is that the sensors must always be directly attuned to the communication device. This may involve for example a mechanical coupling site between the respective communication device and the sensor and/or an electrical coupling for example via electrical contacts between the respective communication device and the sensor. The communication device manufacturers almost all use different configurations of their device housings for their mobile telephones, so that for example the geometries of the devices and/or the existing interfaces on the communication devices have different configurations and/or positions, in order to allow a unified design of a sensor to be connected with the communication device.

Moreover, a loose connection or coupling, which is produced for example solely by a mechanical and/or wireline interface, such as a USB socket, does not afford sufficient stability and robustness, so that such a loose arrangement is hardly practicable. Because of the loose connection, the components may often become lightly damaged or the transmission between components will be faulty, for example, if a plug slides out from the socket during a data transmission.

SUMMARY

Therefore, the problem which the invention proposes to solve is to eliminate the aforementioned drawbacks.

For the solution of this problem, a measurement device of the abovementioned kind is provided with one or more features of the invention. In particular, for the solution of the problem, a measurement device of the abovementioned kind is provided which is characterized in that the measurement module comprises a measurement module housing and the communication module a communication module housing, which can be interconnected in mechanically releasable manner, for example by a mechanical coupling device, and the communication module comprises a communication device. Hence, it is possible to create a unified, especially a mechanical, coupling site and/or interface on both housing pieces, which can be used to connect the communication module to the measurement module. The communication module housing thus takes on the task of a kind of universal adapter. This has the benefit that the connection between the measurement module housing and the communication module is independent of the design of the communication device.

In the following, advantageous embodiments of the invention shall be described, which can be combined alone or in combination with the features of other embodiments optionally together with the features noted above.

According to a first embodiment, the measurement module may comprise a locking element and the communication module a counter-locking element corresponding to the locking element, by which a releasable mechanical connection can be organized between the measurement module and the communication module or in particular is organized in the position of use. In this way, a mechanical coupling can be organized, enabling a secure connecting of the measurement module to the communication module. For example, it may be provided that a secured connection between the measurement module and the communication module is produced by a relative movement between the measurement module and the communication module and can be released once more for example by a corresponding opposite movement. The relative movement may refer for example to a relative movement in the axial direction. The opposite movement may be a relative movement counter to the mentioned relative movement. Thus, thanks to the mechanical coupling, at least one locked position in which the modules are interconnected and/or firmly coupled together and one free position in which the two modules are separate or can be separated are defined.

According to a further embodiment of the measurement device, the interface can be organized for the sending and/or receiving of data and/or commands between the measurement module and the communication module. For example, the interface for the sending and/or receiving of data and/or commands can be organized by a wire connection and/or by a wireless connection. It may be further provided that the operating of the measurement device is done by means of the communication device.

In order to organize an interface for the sending and/or receiving of data and/or commands between the measurement module and the communication module, it may be provided that the communication device comprises at least one terminal connection and the communication module housing at least one counter-terminal connection corresponding to it, for organizing in particular an electrical and/or electromagnetic connection between the communication device and the communication module housing. The terminal connection for example may be designed as a terminal socket, especially a USB socket and/or a jack socket. The counter-terminal connection may be designed for example as a plug, especially a USB plug and/or a jack plug. In order to facilitate a use with different communication devices, especially of different kinds, the counter-terminal connections may be designed movable in its position relative to the other parts of the communication module housing. This makes it possible to orient the counter-terminal connection with respect to the position of the terminal connection on the communication device or to be oriented in its position of use. Alternatively or additionally, it may be provided that the terminal connection and the counter-terminal connection are designed as interconnected or interconnectible sender/receiver. For example, a Bluetooth connection can be provided.

In order to organize an electrical and/or electromagnetic coupling for example between the module housings, the communication module housing may comprise at least one connection element and the measurement module housing a counter-connection element corresponding to the connection element for organizing the interface, for example an electrical and/or electromagnetic interface, between the measurement module and the communication module. The term electromagnetic interface may pertain for example to a wireless interface.

In order to achieve a better, especially a more failsafe use in outdoor areas, the communication module housing and the measurement module housing may interact in the connected state such that a closed measurement device housing is formed. In particular, closed may mean in this context water-tight, so that for example a use of the measurement device is possible during harsh weather conditions, such as rainfall.

According to a further embodiment of the measurement device, the communication device may comprise an input device and/or an output device. For example, the input device and/or the output device may be configured as touchscreens. The input device and the output device may thus be a combined unit.

It may be especially expedient to configure the communication device as a mobile telephone. The mobile telephone may be configured for example as a smartphone. Mobile telephones are manufactured in very large numbers today and have a considerable data processing performance. Thus, it is possible to provide a relatively economical yet still especially powerful measurement device. According to one modification, it may be provided that an operating system of the mobile telephone is closed such that no installation of unapproved software is permitted. This will prevent the coordination between the measurement module and the communication device from being negatively affected by the installation of malicious or incompatible software.

According to a modification of the measurement device, a cover plate is arranged between the communication device and the measurement module housing in the connected state of the communication module and the measurement module. The cover plate may be removable, in particular removable from a hood of the communication module housing, so that an easy access is assured. The cover plate may thus be part of the communication module housing. In particular, at least one, such as the at least one already mentioned connection element, can be arranged on or in the cover plate. For example, the at least one connection element can be designed as a flat contact, which is acted upon in the position of use by the at least one counter-connection element designed as a pin sticking out for example from the measurement module housing. Alternatively or additionally, the cover plate may have a counter-locking element, such as the one previously mentioned. Further, alternatively or additionally to the previously mentioned features, it may be provided that the cover plate has a counter-terminal connection, such as the one previously mentioned. Thus, the communication device may first be connected on the cover plate to the counter-terminal connection, before a hood is placed on the communication module housing. The cover plate may be connected to the hood in the closed state, for example by a fastener, especially a screw connection. In particular, a mounting direction of the communication device may run slanted or perpendicularly to a mounting direction of the cover plate on the hood. The mounting direction may correspond to a coupling direction between the communication module and the measurement module.

In order to better avoid a damaging of the measurement device, the communication module housing can form an impact protection for the communication device, for example by the already mentioned hood. For example, this can be achieved in that the communication device is housed in the communication module housing with the exception of a recess for the input device and/or the output device. Alternatively or additionally, the communication module housing may comprise a spacer. For example, this may be formed as an encircling spacer wall around the input device and/or the output device. Thus, the spacer can avoid a direct bearing of the input device and/or the output device against a supporting base.

According to one embodiment, a connection element, such as the one already mentioned, and/or the previously mentioned counter-connection element are floating mounted. In this way, a relative movement is possible between the connection element and the counter-connection element, without the other components of the measurement device moving relative to each other. This simplifies the making of a connection.

In order to organize a redundant power supply of the measurement device, the communication module and the measurement module may have their own respective energy accumulator. Especially advantageously, a charging of an energy accumulator of the one module by the energy accumulator of the other module is possible, for example, across the interface.

In order to make possible a simple replacement of an interchangeable energy accumulator and/or a SIM card, the communication module housing may have at least one access to an energy accumulator and/or a SIM card of the communication device. In particular, the access may be reclosable and/or reachable from the outside.

According to a further embodiment of the measurement device, the communication module housing can comprise a receiver for inserting the communication device. In particular, the communication device may be secured and/or held in the inserted state in the receiver, for example by at least one holding element.

According to one modification, the communication device may comprise a communication device housing, especially one separate from the communication module housing. This has the benefit that the communication device represents a self-enclosed and/or interchangeable device. The communication device housing is thus an additional housing besides the communication module housing and the measurement module housing, so that it can be provided that it is organized not only to form the measurement device housing closing the measurement device off from the outside, but also in particular being housed inside it.

It may be provided for one embodiment of the invention that the communication module housing is secured by a locking mechanism on the measurement module housing. Advantageously, a secure and easily releasable fastening of the communication module housing on the measurement module housing can be achieved in this way. It may be provided that the communication module housing is guided with a sliding guide on the measurement module housing and the locking mechanism blocks a movement guided by the sliding guide. In this way, an especially secure holding of the communication module housing on the measurement module housing can be achieved.

The invention furthermore relates to a design series with a communication module and at least two different configurations of measurement modules, which can be optionally and releasably connected to the communication module to form a measurement device or which are connected in the position of use to form a measurement device. Thus, the above-stated problem can also be solved by the design series. The design series has the benefit over previously known ones that a stable connection of a universally applicable communication module can be organized with different measurement modules, in order to perform various measurements of physical or chemical parameters. Thus, one does not require several individual measurement devices, but only several interchangeable measurement modules. Thus, the design series can replace a multitude of different and costly measurement devices, since the communication module is reusable and therefore the overall costs can be significantly reduced. Moreover, the benefits mentioned for the measurement device apply analogously, since it can be provided that the design series can form a measurement device as is described and claimed herein.

Finally, the invention relates to the use of a communication device for sending and/or receiving of data and/or commands to and/or from a sensor, which is arranged in a measurement module housing, wherein the communication device is inserted in a communication module housing, wherein the communication module housing is mechanically connected to the measurement module housing and assembled to form a measurement device, and wherein an interface is organized between the sensor and the communication device for the sending and the receiving of data and/or commands. For example, the measurement device may be a measurement device as described and claimed herein, so that the benefits described in this context hold analogously for the mentioned use.

BRIEF DESCRIPTION OF THE DRAWINGS

The invention shall now be described more closely with the aid of an exemplary embodiment, though not being restricted to this exemplary embodiment. Further exemplary embodiments will result by the combination of the features of one or more claims with each other and/or with one or more features of the exemplary embodiments.

Shown are.

DETAILED DESCRIPTION

FIGS. 3 to 7 show a measurement device denoted overall as 1.

Figure 1:
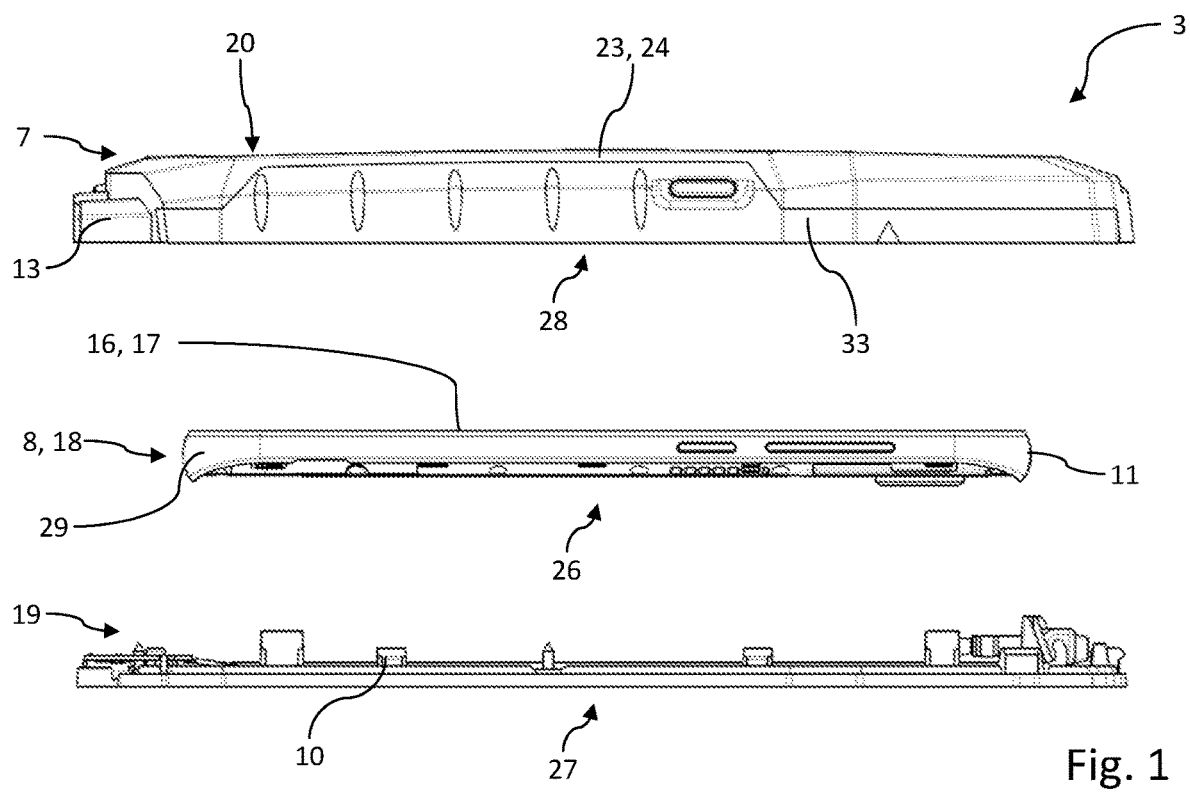
FIG. 1 a side view of a communication module with opened communication module housing, wherein a hood of the communication module housing has been removed from a cover plate of the communication module housing, so that a communication device arranged in the position of use in the communication module housing can be removed and/or is accessible, FIG. 2 a perspective view of the communication module of FIG. 1, likewise showing here the communication module housing in the opened state, FIG. 3 a perspective view of a measurement device with a measurement module and a communication module, wherein the communication module is not shown in the position of use with the measurement module, so that there is no mechanical coupling of the modules and no interface for communication is produced, the communication module being shown from its outer side, organized for display and input purposes, FIG. 4 a side view of the measurement module and the communication module of the measurement device of FIG. 3, FIG. 5 a perspective view of the measurement device of FIGS. 3 and 4, wherein here as well the communication module is not shown in the coupled state with the measurement module, so that no communication interface is organized between the modules, showing respectively a top view of an inner surface of the communication module and the measurement module which is not visible in the coupled state, said surfaces together forming a coupling for the mechanical connection of the modules, FIG. 6 a top view of the measurement device from the previously mentioned figures, wherein here as well the inner surfaces of the communication module and the measurement module which are not visible in the coupled state are shown respectively, FIG. 7 a side view of a partial section of the measurement device of FIGS. 3 to 6, the measurement device housing being represented as at least partly transparent, FIG. 8 a side view of a measurement device according to the invention, FIG. 9 the measurement device of FIG. 8 with housings partly cut open to show the locking mechanism in the closed state, FIG. 10 the measurement device in an analogous representation to FIG. 9 with the locking mechanism in the released state, FIG. 11 the measurement device in an analogous representation to FIG. 9, the communication module housing having been displaced along a sliding guide, FIG. 12 the measurement module housing of the measurement device of FIG. 8 with removed communication module housing, and FIG. 13 the removed communication module housing of the measurement device of FIG. 8.
Figure 2:
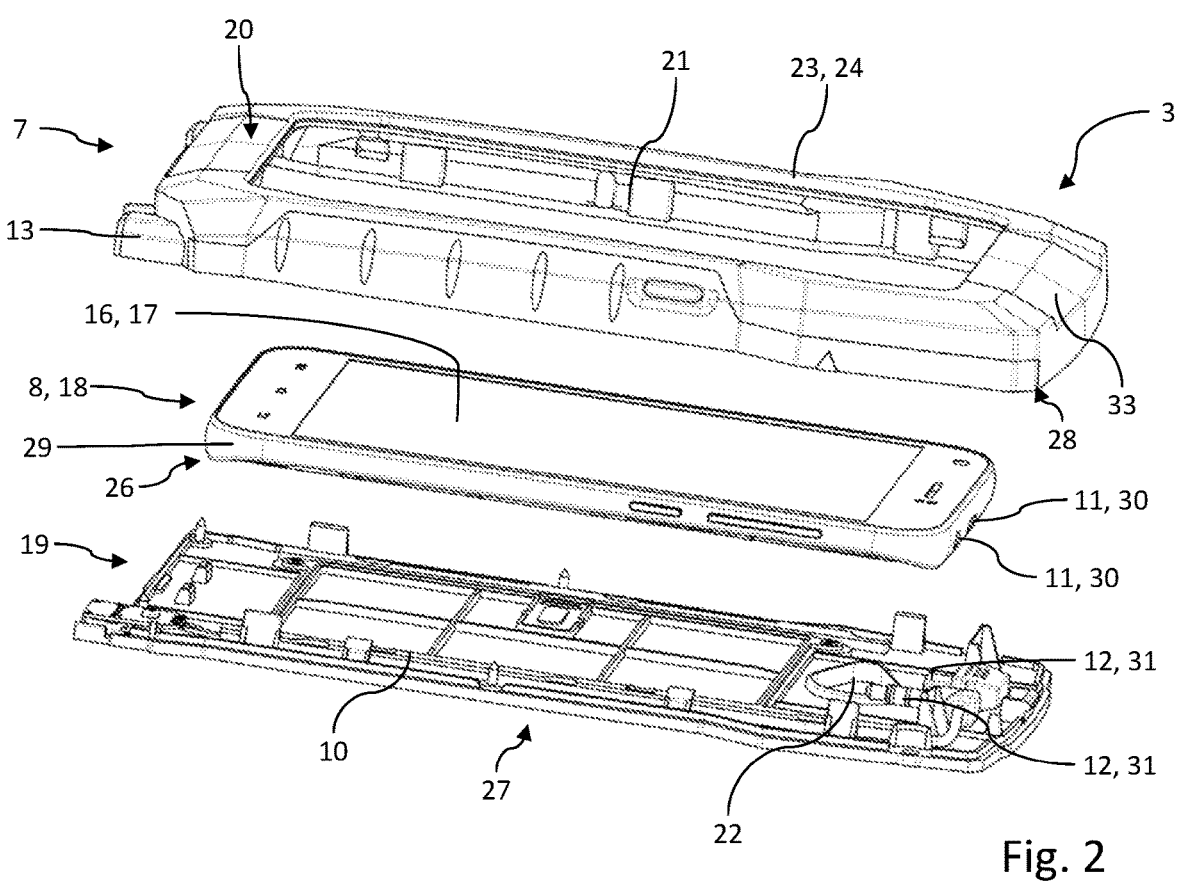
Figure 3:
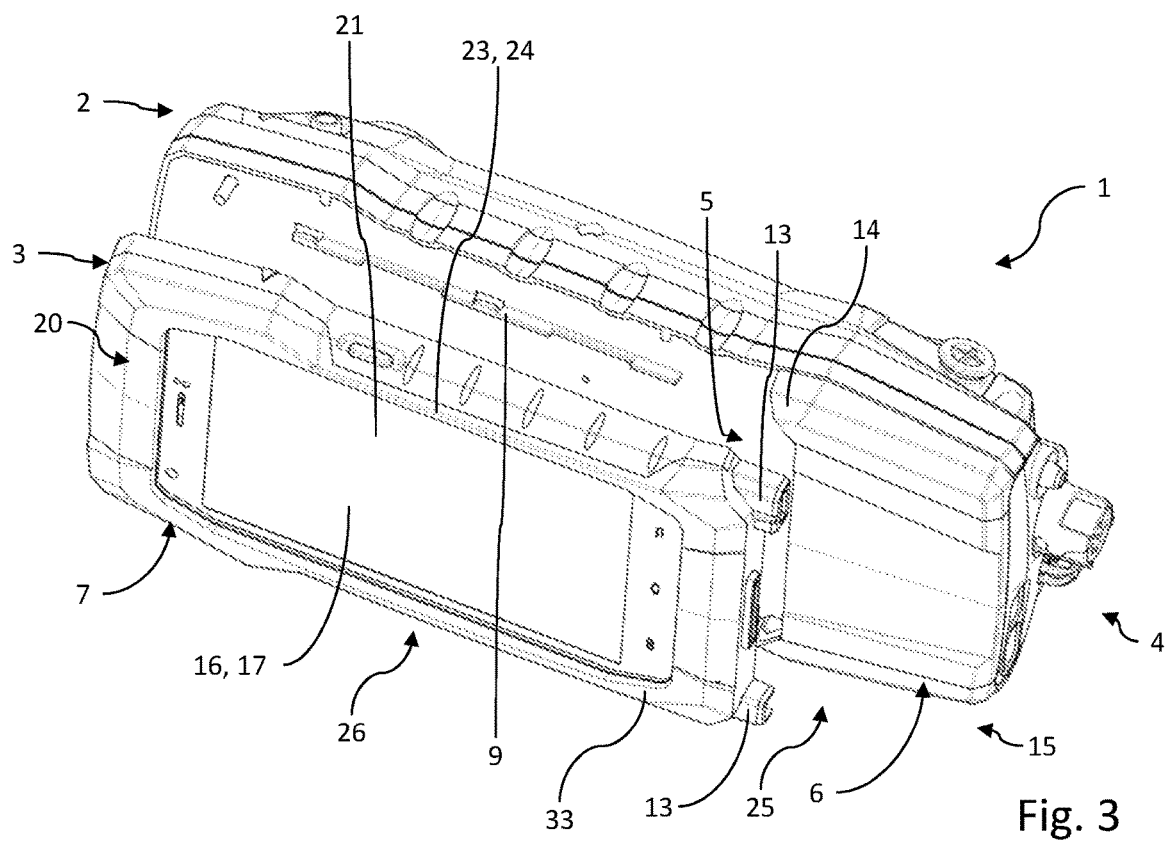
Figure 4:
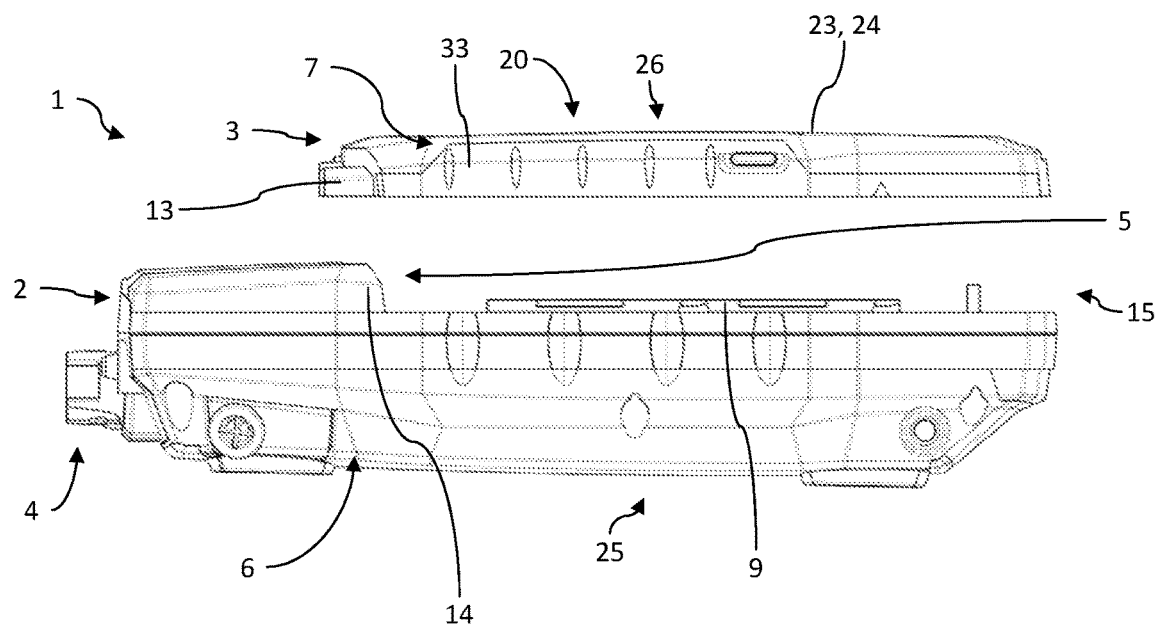
Figure 5:
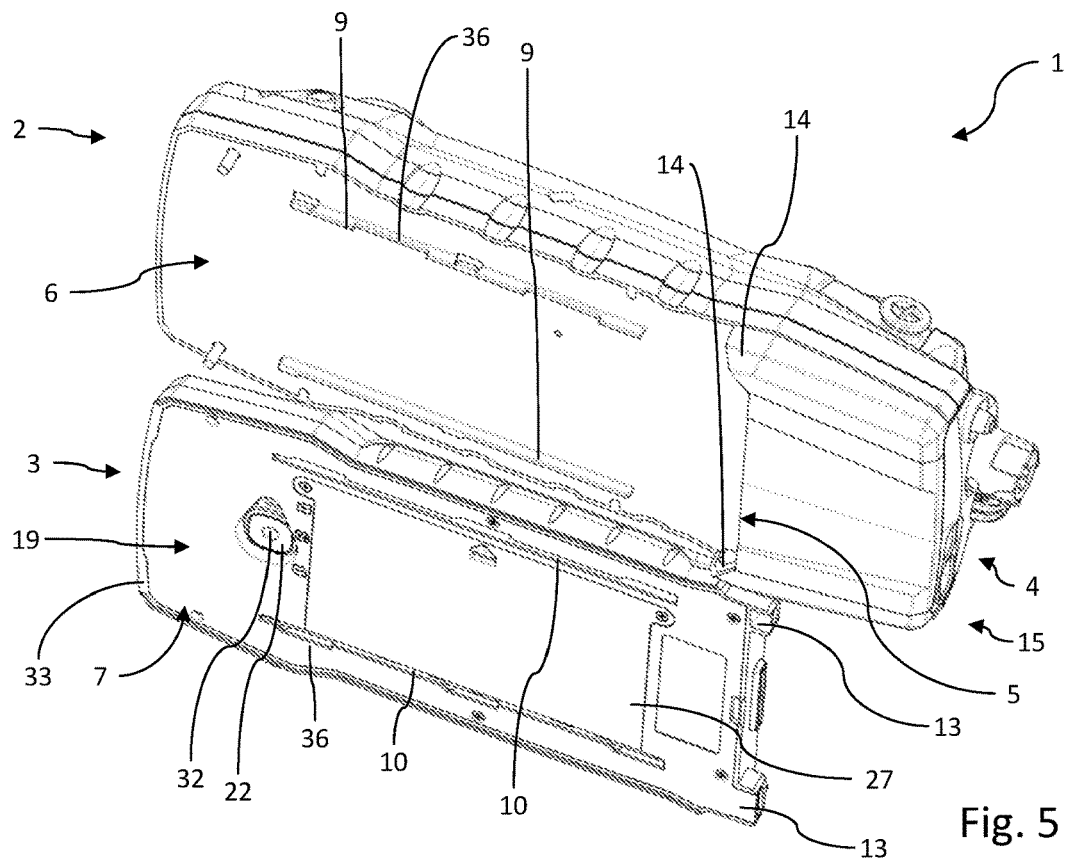
Figure 6:
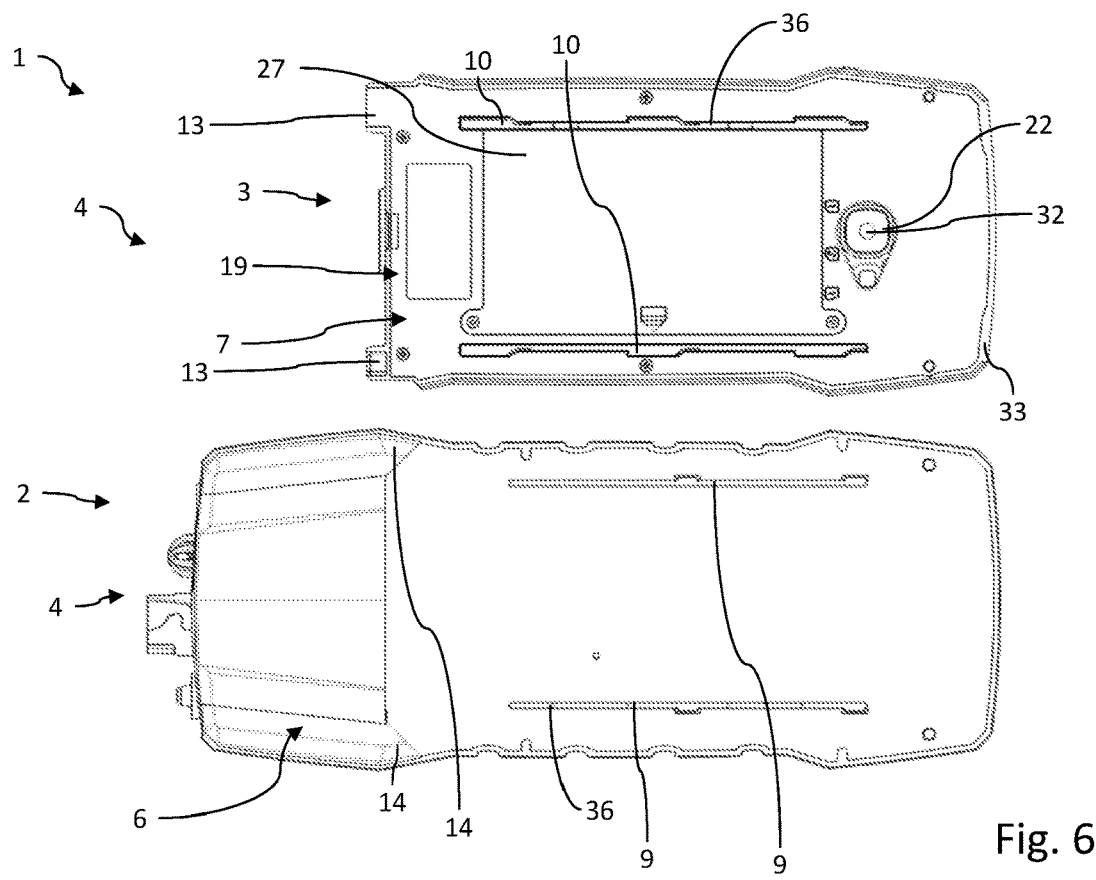
Figure 7:
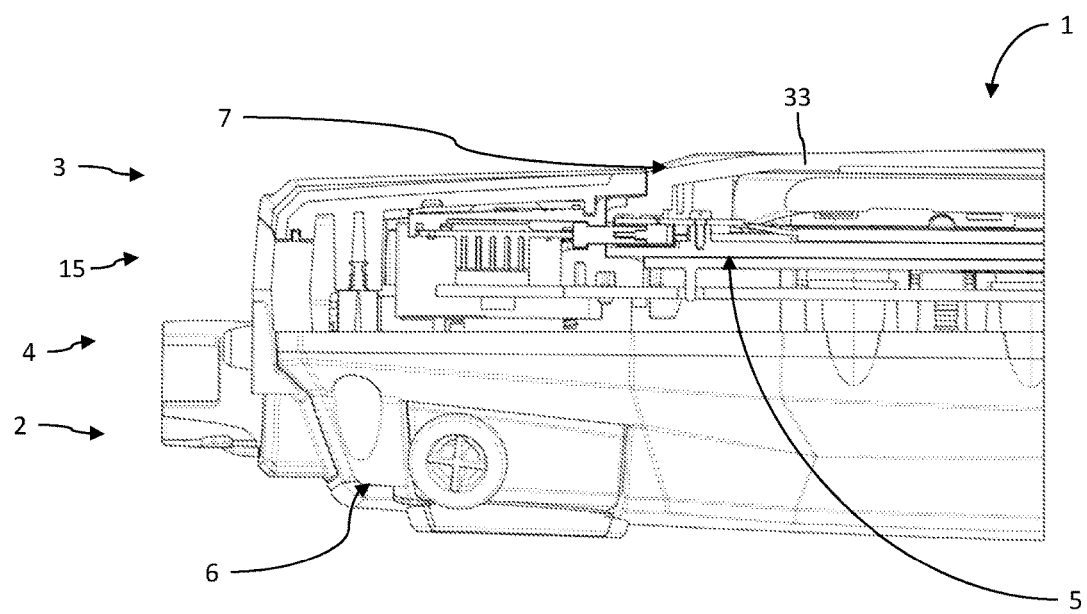
Figure 8:
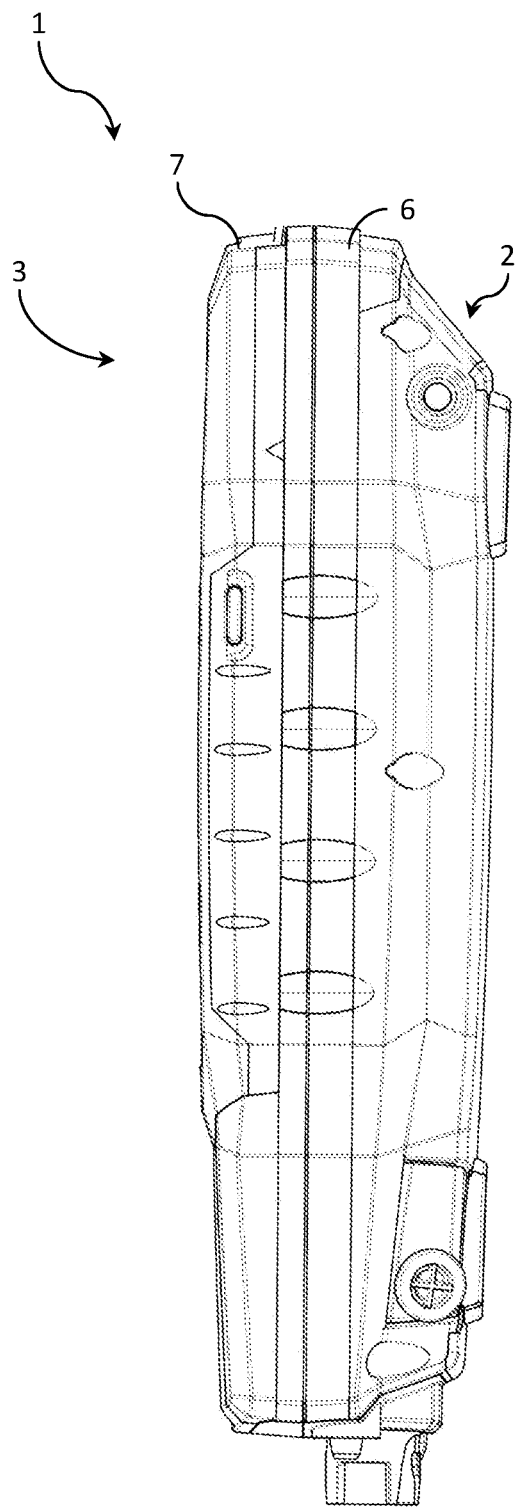

The measurement device 1 comprises a measurement module 2 and a communication module 3, as shown for example in FIGS. 1 and 2 without the measurement module 2.

The measurement module 2 comprises at least one sensor 4 for measuring a physical and/or chemical parameter. Many possible designs of sensors 4 are already known from the prior art, which can be used in the measurement module 2 described here.

Between the measurement module 2 and the communication module 3 there is organized in the position of use, i.e., in the coupled state of the two modules 2, 3, an interface 5 for communication between the measurement module 2 and the communication module 3.

The two modules 2, 3 may be releasably interconnected, so that the aforementioned interface 5 may be removed for example in the decoupled state of the measurement module 2 and the communication module 3. However, it is also conceivable for the interface 5 to remain in place even when the modules 2, 3 are separated. For example, this may be accomplished through a wireless connection. The interface 5 may be organized for a bidirectional data transmission.

The measurement module 2 comprises a measurement module housing 6, in which the sensor 4 is at least partly housed, i.e., its electronics for example. The electronics may be housed water-tight, for example.

The communication module 3 comprises a communication module housing 7, in which a communication device 8, such as the one shown in FIGS. 1 and 2, can be inserted and enclosed therein. When the communication module housing 7 is closed, the communication device 8 is embedded and secured in the communication module housing 7.

The communication module 3 and the measurement module 2 may be interconnected by a mechanical coupling. In the position of use, the two modules 2 and 3 may thus be mechanically and releasably interconnected via the measurement module housing 6 and the communication module housing 7.

In order to produce the mechanical coupling between the measurement module housing 6 and the communication module housing 7 in the position of use, the measurement module 2 may comprise a locking element 9 and the communication module 3 a counter-locking element 10 corresponding to the locking element 9. A releasable mechanical connection can be produced between the locking element 9 and the counter-locking element 10, so that the two modules 2 and 3 are coupled together. In the coupled position, a securing connection can thus be produced between the two modules 2 and 3. A decoupling of the two modules 2, 3 is possible by a relative movement of the communication module 3 to the measurement module 2. The relative movement may occur for example in the axial direction, while a corresponding opposite movement, especially a relative movement, may occur in the opposite direction for the decoupling.

Alternatively or in addition, a locking mechanism in the form of a quick closure for example can be formed on the measurement device. Thanks to the locking mechanism, the mechanical coupling between the two modules 2 and 3 can be secured, so that no unintentional separation or loosening of the locking mechanism is possible. The locking mechanism may comprise for example an activating element which can turn about a pivot axis, so that a turning of the activation element, especially by at least 90°, preferably by 180°, makes possible a closing or releasing of a locking mechanism.

As can be seen in FIGS. 1 to 6, the locking element 9 may be designed as a locking rail, which in the position of use engages with the counter-locking element 10 on the communication module, configured as a corresponding locking groove, and is locked therein. However, other configurations are also possible, not being shown in the figures. For example, the locking element may be configured as a locking lug, locking hook, or locking loop, which can be mechanically coupled to a corresponding counter-locking element 10. The locking groove may be formed for example on the cover plate 13.

Alternatively or in addition, the locking element 9 or another locking element may be configured as a bulge with an insertion opening to receive the counter-locking element 10 formed by the communication module housing 7, especially another counter-locking element. A direction of insertion through the insertion opening into the bulge may run parallel to the longitudinal axis of the measurement device 1. Especially advantageously, this configuration may be used in combination with the already previously mentioned locking mechanism.

The interface 5 may be organized for the sending and/or receiving of data and/or commands between the measurement module 2 and the communication module. Thus, the interface 5 can make possible a bidirectional communication between the modules 2, 3. For example, the interface 5 may be organized by a wire connection and/or a wireless connection.

An operating of the measurement device 1, which is done for example by entering commands, may occur via the communication device 8, the commands being relayed from the communication device 8 to the sensor 4 via the interface 5.

As can be seen in FIGS. 1 and 2, the communication device 8 comprises at least one terminal connection 11, which may be designed, for example as shown in FIGS. 1 and 2, as a terminal socket 30. The communication device 8 may comprise for example a USB terminal connection and/or a jack terminal connection (or other audio terminal connection). The communication module housing 7 comprises a corresponding counter-terminal connection 12, and by connecting the terminal connection 11 and the counter-terminal connection 12 an electrical connection can be organized between the communication device 8 and the communication module housing 7 or is organized in the position of use.

In order to form the interface 5 between the modules 2, 3, besides the mechanical connection between the measurement module 2 and the communication module 3, the measurement device 1 comprises at least one connection element 13 on the communication module housing 7 and one counter-connection element 14 corresponding to the connection element 13 on the measurement module housing 6. The connection element 13 and the counter-connection element 14 may be electrical contacts, for example. The connection element 13 may be designed for example as at least one plug and the corresponding counter-connection element 14 can be designed as at least one socket. However, the reverse arrangement is also possible. Thanks to the already described relative movement between the measurement module 2 and the communication module 3, by which a mechanical coupling of the two modules 2, 3 is possible, it is possible at the same time to produce a connection between the at least one connection element 13 and the corresponding counter-connection element 14. The connection element 13 may be shoved or inserted by the relative movement for example into the counter-connection element 14, so that the interface 5 is formed.

However, it is also possible to configure the connection element 13 and the counter-connection element 14 respectively as a sender/receiver to organize a wireless connection.

Thanks to the coupling of the communication module 3 and the measurement module 2 or by coupling of the communication module housing 7 and the measurement module housing 6, it is possible to form a measurement device housing 15 which is closed off from the outside, for example, water-tight.

The communication device 8 comprises an input device 16 and an output device 17. For example, the input device 16 and the output device 17 may be designed as a combined input-output device. One possible configuration here may be a touchscreen for example, by which both information can be displayed and commands entered.

One possible design of the measurement device 1, as shown for example in the figures, may thus provide that the communication device 8 is configured as a mobile telephone 18. For example, it may be a smartphone.

The communication module housing 7 comprises a cover plate 19 which can be removed from a hood 33 of the communication module housing 7. By use of connecting the hood 33 and the cover plate 19, the communication device 8 arranged in a receiver 28 of the communication housing 7 may thus be housed in the communication module housing 7. The hood 33 and the cover plate 19 may be joined together for example by a screw connection or another fastener.

It may be provided that at least one connection element 13, for example the one already mentioned, is arranged on or in the cover plate 19, in order to form the interface 5. For example, alternatively or additionally to the previously mentioned embodiment, the connection element may be a flat contact, which is connected for example to a counter-connection element 14 on the measurement module housing 6 in the position of use, for example a pin or sliding contact formed as a corresponding mating contact.

An especially good impact protection 20 for the communication device 8 can be formed by the communication module housing 7. The communication module housing 7 may have a recess 21 on its outer side for the input device 16 and/or the output device 17. On its interior side facing toward the measurement module 2 in the position of use, the communication module housing 7 may have a recess 22 for a recording device 32, for example on the cover plate 19. The recording device 32 may be, for example, a camera, such as a mobile telephone camera.

In the decoupled state of the two modules 2, 3, a taking of pictures and/or video may thus be done by means of the communication module 3. The communication module housing 7 may therefore have additional control elements on its outer side, such as control buttons, in order to activate them to take a picture or a video by use of the recording device 32 and/or to perform a setting of parameters.

Alternatively or additionally, an opening and/or a cutout may be provided on the measurement module 2, which in the coupled state with the communication module 3 is situated at the height of the recording device 32. Thus, it is possible to use the recording device 32 to take pictures or videos of the surroundings even in the coupled state of the two modules 2, 3.

In order to better avoid damage to the input device 16 and/or output device 17 during the use of the measurement device 1, the communication module housing 7 has a spacer 23 on its outer side in the position of use. By use of the spacer 23, one can avoid placing an input device 16 and/or output device 17 configured for example as a monitor screen directly on a supporting base. The spacer 23 may be configured for example as a spacer wall 24, which is arranged uninterrupted and/or encircling about the input device 16 and/or the output device 17 and/or the cutout 21.

In order to make possible a relative movement between the connection element 13 and the counter-connection element 14, the connection element 13 and/or the counter-connection element 14 may be mounted floating. Thus, it is possible for at least one of the two elements 13, 14 to be displaced relative to the other element 13, 14, without the other components of the measurement device 1 having to be moved relative to each other.

In order to outfit the communication module housing 7 with different communication devices 8 and to connect these via the counter-terminal connection 12 to the communication module housing 7, the counter-terminal connection 12 can be movable in its position relative to the hood 33 and/or to the cover plate 19.

The measurement module 2 and the communication module 3 may each have their own energy accumulator 25, 26, so that an independent power supply of the modules is possible even in the separated state. Hence, for example, it may be possible, after separating the measurement module 2 from the communication module 3, to perform a measurement with the measurement module 2, operated by means of the communication module 3, even though the measurement module is separated from the communication module 3. The operating may be done for example by a wireless connection, such as Bluetooth.

In order to accomplish an especially simple operation of the measurement module 2 in the decoupled state, so that both modules 2, 3 do not need to be held by the hands of the user, a fixation device may be formed on the communication module 3, by means of which the communication module 3 can be secured to a wall or some other object. It is thus possible for the user not to hold the communication module 3, yet continue to operate it. For example, the fixation device may comprise at least one magnet, by which a fastening is possible to a magnetizable object, such as a heating system. Alternatively or additionally, the fixation device may have a Velcro® hook and loop textile fastening connection.

Furthermore, a certain redundancy may be achieved by the two energy accumulators 25, 26, so that for example it is possible to perform a charging of one of the two energy accumulators 25, 26 by the other energy accumulator 25, 26, when so required. Thus, longer operating periods for the measurement device 1 are possible, since a continued use is also possible if one of the energy accumulators 25, 26 of the modules 2, 3 is discharged, since an energy supply may occur through the other energy accumulator 25, 26. A charging of one of the energy accumulators 25, 26 by the other energy accumulator 25, 26 is possible for example through the interface 5.

The communication housing 7 has an access 27, which may be formed for example by the cover plate 19 or in addition to the cover plate 19. Through the access 27, it is possible to open the communication module housing 7 at least for the replacement of an energy accumulator 26 and/or a SIM card of the communication device 8.

The communication module housing 7 has a receiver 28, which may be formed for example in the hood 33. The communication device 8 may be inserted into the receiver 28 in the position of use of the communication module 3.

The receiver 28 may comprise fixation device for the securing and/or holding of the communication device 8, so that this is firmly installed in it in the closed state of the communication module housing 7, especially by force locking and/or form fitting. The receiver 28 for example may be outfitted at least partly with soft and/or elastic and/or compressible fixation device, which ensure a better protection of the communication device 8 if dropped or subject to other impacts.

The communication device 8 has its own communication device housing 29, which is formed separately from the communication module housing 7. Thus, it is possible for the communication device 8 to constitute a self-enclosed and/or interchangeable module. The electronics of the communication device 8 are thus housed in two housings independent of each other in the position of use, namely, in the communication module housing 7 and in the communication device housing 29.

Not shown in the figures, but still part of the invention, is a design series with a communication module 3 and at least two different configurations of measurement modules 2, which may be optionally and releasably connected to the communication module 3 to form a measurement device 1. Thus, for example, it is possible to produce a measurement device 1 as is described and claimed herein.

The design series is distinguished from previously known measurement devices in that it comprises interchangeable measurement modules 2, which may have for example different sensors 4. Thus, it is possible, by selecting a particular measurement module 2, to measure a particular physical and/or chemical quantity by means of a sensor 4 configured in the measurement module 2. No switching of the communication module 3 is required for this. Thus, with a single communication module 3 it is possible to operate two or more measurement modules 2 in parallel. In this way, it is possible to survey large installations, having a multitude of measurement sites that need to be measured at the same time. Thus, by this method, it is possible to scale the number of measurement channels and sensors by adding on additional measurement modules 2 through a wireless connection, such as a Bluetooth connection. Since the largest computing power and/or storage capacity is configured in the communication module 3, its manufacture is relatively costly. Thanks to the reusability of the communication module 3 with different measurement modules 2, a large portion of the costs may therefore be saved, which would otherwise be incurred for conventional measurement devices.

The communication device 8 shown in FIGS. 1 and 2 is especially suitable for use in sending and/or receiving of data and/or commands to and/or from a sensor 4, which is arranged in a measurement module housing 6. The communication device 8 is inserted in a communication module housing 7, wherein the communication module housing 7 is mechanically connectible to the measurement module housing or is so connected in the position of use, in order to form a measurement device 1. Between the sensor 4 and the communication device 8 there is organized an interface 5 for the sending and/or receiving of data and/or commands.

FIGS. 8 to 12 show another exemplary embodiment of the invention. Structurally and/or functionally similar or identical components and functional units to the previous exemplary embodiments are denoted with the same reference numbers and are not described yet again. Therefore, the remarks for FIGS. 1 to 7 hold accordingly for FIGS. 8 to 12. In particular, the measurement device 1 shown in FIGS. 8 to 12 may be designed similar to the one in FIGS. 1 to 7.

FIGS. 8 to 12 show a motion sequence and shall be described together in the following.

Figure 9:
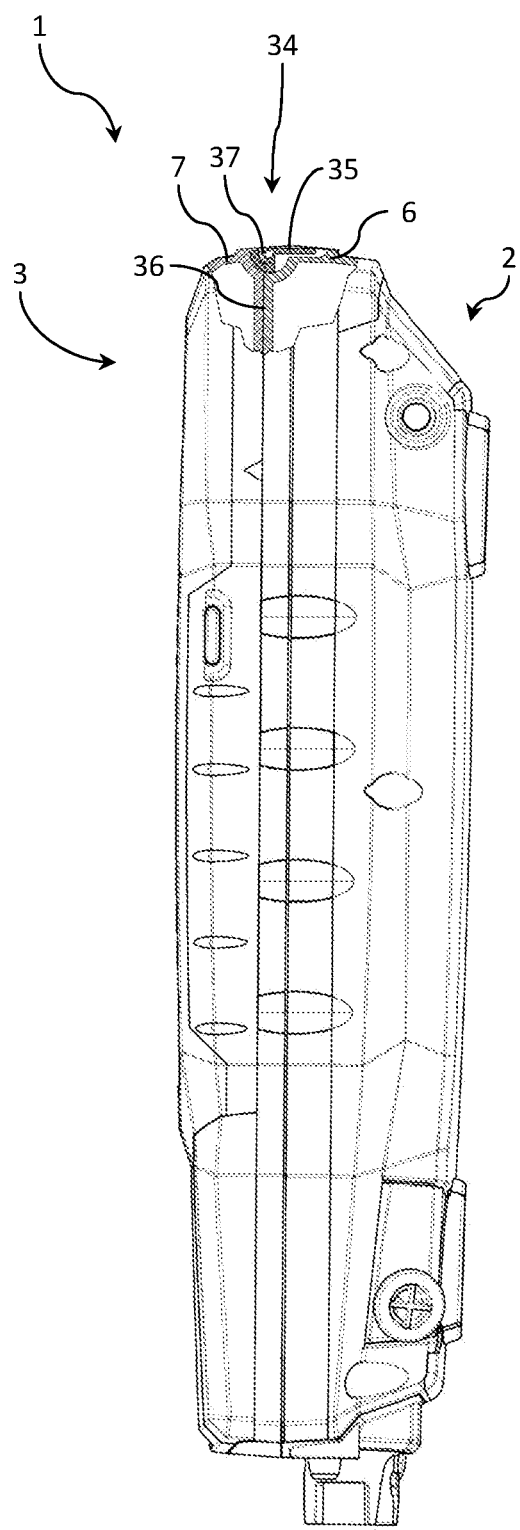
Figure 10:
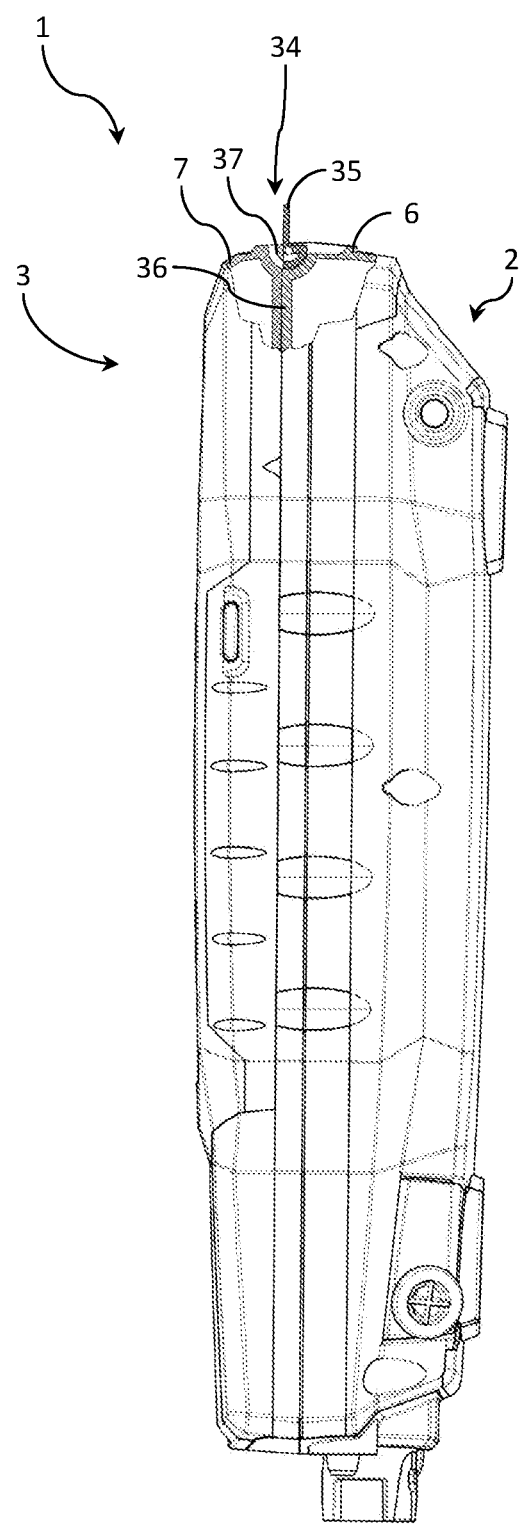
Figure 11:
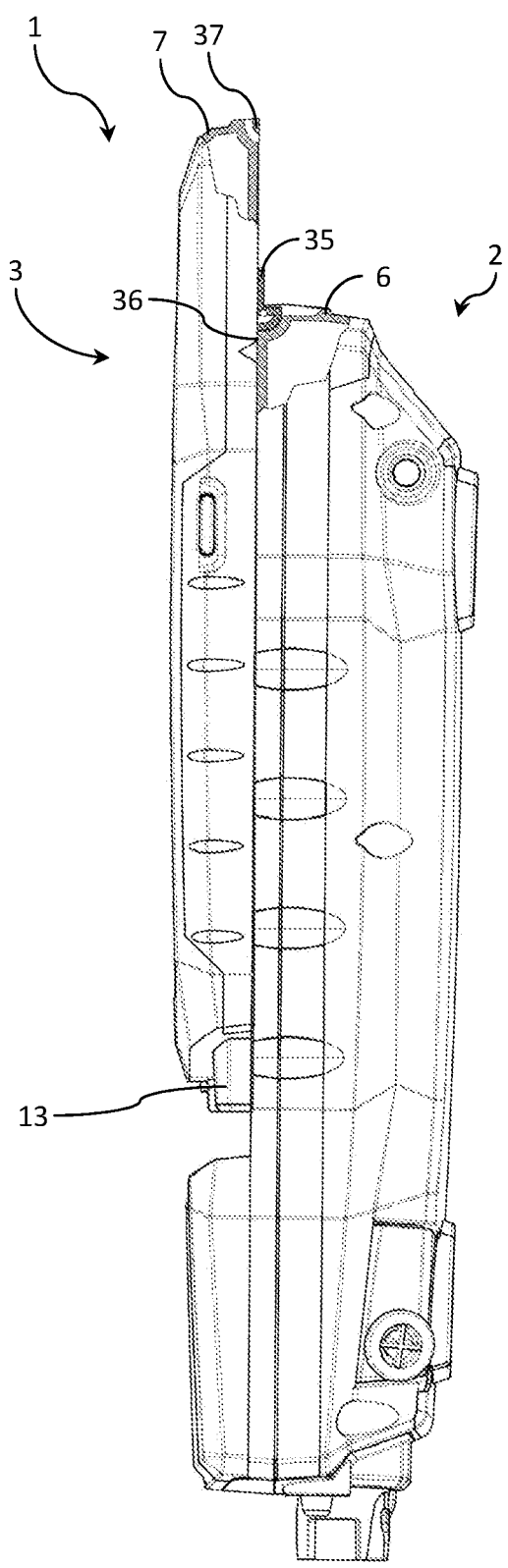

In FIG. 9 it can be seen that the measurement module 2 comprises a locking mechanism 34, having a swivel lever 35. In further exemplary embodiments, another fastening is provided in place of the swivel lever.

This locking mechanism 34 blocks, in the position of the swivel lever 35 shown in FIG. 9, a displacement of the communication module housing 7 relative to the measurement module housing 6. The swivel lever 35 for this purpose engages with a holding piece 37 on the communication module housing 7. This displacement is realized by a sliding guide 36.

Figures 12, 13:
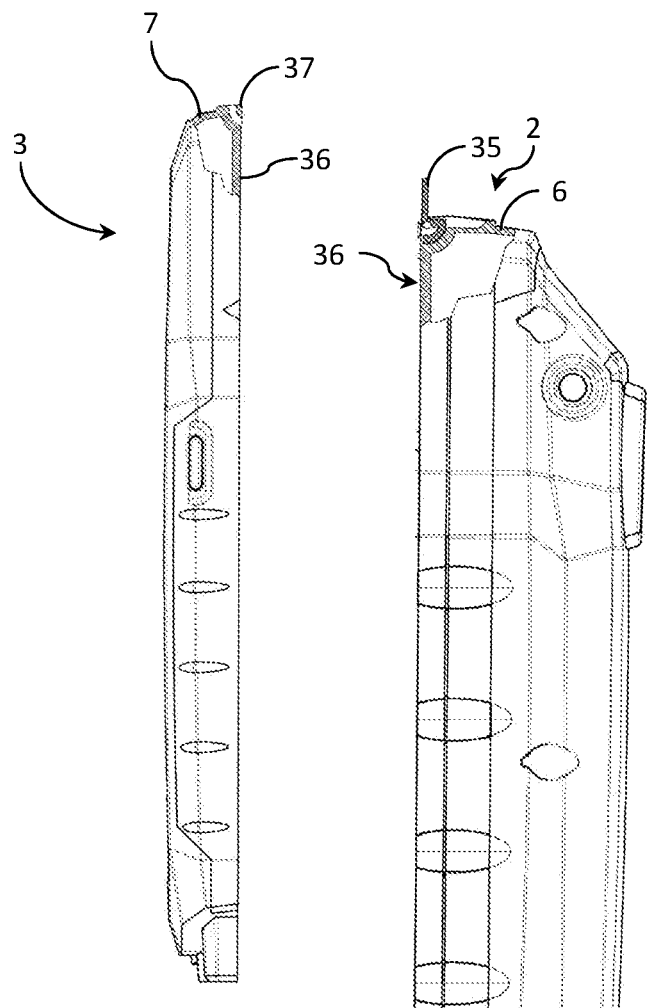

If the swivel lever 35 is thrown over (FIG. 10), the displacement is released. The communication module housing 7 can thus be displaced along the sliding guide 36 on the measurement module housing 6 (FIG. 11), until the communication module housing 7 can be removed from the measurement module housing 6 (FIGS. 12 and 13).

The invention thus relates in particular to a measurement device 1 comprising a measurement module 2 and a communication module 3, wherein the measurement module 2 comprises at least one sensor 4 for measuring a physical or chemical quantity, wherein in the position of use an interface 5 is organized for the communication between the measurement module 2 and the communication module 3, wherein the measurement module 2 comprises a measurement module housing 6 and the communication module 3 a communication module housing 7, which can be interconnected in mechanically releasable manner and form in the connected state a closed measurement device housing 15.

LIST OF REFERENCE SYMBOLS

1 Measurement device
2 Measurement module
3 Communication module
4 Sensor
5 Interface, especially an electrical and/or electromagnetic interface; communication interface
6 Measurement module housing
7 Communication module housing
8 Communication device
9 Locking element
10 Counter-locking element
11 Terminal connection, especially an electrical or electromagnetic terminal connection
12 Counter-terminal connection, especially an electrical or electromagnetic counter-terminal connection
13 Connection element, especially an electrical or electromagnetic connection element
14 Counter-connection element, especially an electrical or electromagnetic counter-connection element
15 Measurement device housing
16 Input device
17 Output device
18 Mobile telephone
19 Cover plate
20 Impact protection
21 Recess for input and/or output device
22 Recess for recording device
23 Spacer
24 Spacer wall
25 Energy accumulator of the measurement module
26 Energy accumulator of the communication module
27 Access
28 Receiver
29 Communication device housing
30 Terminal socket
31 Plug
32 Recording device; imaging device
33 Hood
34 Locking mechanism
35 Swivel lever
36 Sliding guide
37 Holding piece

The invention claimed is:

1. A measurement device (1) comprising:
a measurement module (2) including at least one sensor (4) for measuring at least one of a physical or chemical parameter, and a measurement module housing (6);
a communication module (3) including a communication module housing (7) and a communication device (8);
an interface (5) for communication between the measurement module (2) and the communication module (3);
the measurement module housing (6) and the communication module housing (7) are interconnectable in a mechanically releasable manner; and
the measurement module (2) further comprises a locking element (9) and the communication module (3) further comprises a counter-locking element (10) corresponding to the locking element (9), for affecting a releasable mechanical connection between the measurement module (2) and the communication module (3).

2. The measurement device (1) as claimed in claim 1, wherein the interface (5) is configured for at least one of sending or receiving at least one of data or commands between the measurement module (2) and the communication module (3).

3. The measurement device (1) as claimed in claim 1, wherein the interface includes at least one of a wire connection or a wireless connection.

4. The measurement device (1) as claimed in claim 1, wherein the communication device (8) further comprises at least one terminal connection (11), and the communication module housing (7) includes at least one counter-terminal connection (12) corresponding to the terminal connection to form an electrical connection between the communication device (8) and the communication module housing (7).

5. The measurement device (1) as claimed in claim 1, wherein the communication module housing (7) further comprises at least one connection element (13) and the measurement module housing (6) further comprises a counter-connection element (14) corresponding to the connection element (13) that form the interface (5) between the measurement module (2) and the communication module (3).

6. The measurement device (1) as claimed in claim 1, wherein the communication module housing (7) and the measurement module housing (6) interact in a connected state such that a closed measurement device housing (15) is formed.

7. A measurement device (1) comprising:
a measurement module (2) including at least one sensor (4) for measuring at least one of a physical or chemical parameter, and a measurement module housing (6);
a communication module (3) including a communication module housing (7) and a communication device (8);
an interface (5) for communication between the measurement module (2) and the communication module (3);
the measurement module housing (6) and the communication module housing (7) are interconnectable in a mechanically releasable manner; and
the communication device (8) further comprises an input device (16) and an output device (17).

8. The measurement device (1) as claimed in claim 1, wherein the communication device (8) is configured as a mobile telephone (18).

9. The measurement device (1) as claimed in claim 5, further comprising a cover plate (19) arranged between the communication device (8) and the measurement module housing (6) in a connected state of the communication module (3) and the measurement module (2), and the at least one connection element (13) is arranged on or in the cover plate (19).

10. The measurement device (1) as claimed in claim 1, wherein the communication module housing (7) forms an impact protection (20) for the communication device (8).

11. The measurement device (1) as claimed in claim 1, wherein the communication module housing (7) further comprises a spacer (23), by which a direct bearing of at least one of an input device (16) or an output device (17) of the communication device (8) against a supporting base is avoided.

12. The measurement device (1) as claimed in claim 5, wherein at least one of the connection element (13) or the counter-connection element (14) are floating mounted such that a relative movement is possible between the connection element (13) and the counter-connection element (14), without other components of the measurement device (1) moving relative to each other.

13. The measurement device (1) as claimed in claim 1, wherein the communication module (3) and the measurement module (2) each further comprise a respective energy accumulator (25, 26).

14. The measurement device (1) as claimed in claim 13, wherein the interface (5) is configured for charging of one said energy accumulator (25, 26) of one of the communication or measurement modules (2, 3) by the energy accumulator (25, 26) of the other of the communication or measurement modules (2, 3).

15. The measurement device (1) as claimed in claim 1, wherein the communication module housing (7) includes at least one access (27) to at least one of an energy accumulator (26) or a SIM card of the communication device (8).

16. The measurement device (1) as claimed in claim 1, wherein the communication module housing (7) further comprises a receiver (28) for inserting the communication device (8), and in which the communication device (8) is at least one of secured or held in the inserted state.

17. The measurement device (1) as claimed in claim 1, further comprising a locking mechanism (34) on the measurement module housing (6), and the communication module housing (7) is secured by the locking mechanism (34), and the communication module housing (7) is guided with a sliding guide (35) on the measurement module housing (6) and the locking mechanism (34) blocks a movement guided by the sliding guide (35).

18. The measurement device (1) as claimed in claim 1, including the communication module (3) and at least two different configurations of the measurement modules (2), and the communication module (3) can be optionally and releasably either of the two different configurations of the measurement modules.

19. A method of at least one of sending or receiving at least one of data or commands at least one of to or from a sensor (4) using a measuring device (1), the method comprising:
providing a communication module (3) including a communication module housing (7) and a measurement module (2) including the sensor (4) and a measurement module housing (6);
inserting a communication device (8) in the communication module housing (7);
mechanically connecting and assembling the communication module housing (7) to the measurement module housing (6) to form a measurement device (1);
coupling the measurement module (2) and the communication module (3) together by forming a releasable mechanical connection between a locking element (9) of the measurement module (9) and a corresponding counter-locking element (10) of the communication module (3) and
using an interface (5) provided between the sensor (4) and the communication device (8) for the at least one of sending or receiving the at least one of data or commands.

* * * * *